United States Patent [19]

Aruga et al.

[11] Patent Number: 4,757,409
[45] Date of Patent: Jul. 12, 1988

[54] CARRIAGE MOVEMENT DEVICE FOR A MAGNETIC MEMORY DEVICE

[75] Inventors: Tomoe Aruga; Hideya Yokouchi; Tadashi Sugiyama; Nozomu Inoue; Kaneo Yoda, all of Suwa, Japan

[73] Assignee: Seiko Epson Kabushiki Kaisha, Tokyo, Japan

[21] Appl. No.: 98,711

[22] Filed: Sep. 21, 1987

Related U.S. Application Data

[63] Continuation of Ser. No. 617,405, Jun. 5, 1984, abandoned.

[30] Foreign Application Priority Data

Jun. 7, 1983 [JP] Japan ................. 58-101193

[51] Int. Cl.$^4$ ............................................. G11B 5/55
[52] U.S. Cl. ..................................... 360/106; 74/89.2
[58] Field of Search .................... 360/106, 99, 98, 97; 74/89.2

[56] References Cited

U.S. PATENT DOCUMENTS

| | | | |
|---|---|---|---|
| 4,366,722 | 1/1983 | Hasler | 360/106 |
| 4,442,046 | 4/1984 | Edmonston | 74/89.2 |
| 4,456,937 | 6/1984 | Iftikar et al. | 360/106 |
| 4,466,034 | 8/1984 | Newberry | 360/106 |
| 4,476,508 | 10/1984 | Tronzano et al. | 360/106 |

FOREIGN PATENT DOCUMENTS 0060341  9/1982  European Pat. Off. ............ 360/106
0085970  8/1983  European Pat. Off. ............ 360/106
0109678  5/1984  European Pat. Off. ............ 360/106

OTHER PUBLICATIONS

Bailey, "Band Drive/Pulley Attachment for Magnetic Head," IBM Technical Disclosure Bulletin, vol. 17, No. 11, Apr. 1975, pp. 3428–3429.

*Primary Examiner*—John H. Wolff
*Assistant Examiner*—Matthew J. Bussan
*Attorney, Agent, or Firm*—Blum Kaplan

[57] ABSTRACT

A carriage movement device for a magnetic memory device having a carriage with a first end and a second end, the carriage being slidably supported on a rod is provided. The carriage movement device has a capstan which is angularly rotated by a driver and a belt having an elongated slot extending form a portion of the belt having the second width, the slot being at least as wide as the first end wrapping around the capstan. A first belt connector connects the first end of the belt to the first end of the carriage. A second belt connector connects the second end of the belt to the second end of the carriage. The second end of the belt is affixed to a second belt connector which is selectively engaged to the second end of the carriage by stretching the belt about the carriage and or deflecting an elastic projection formed on the carriage. The angular rotation of the capstan is accurately converted into linear movement of the carriage.

13 Claims, 4 Drawing Sheets

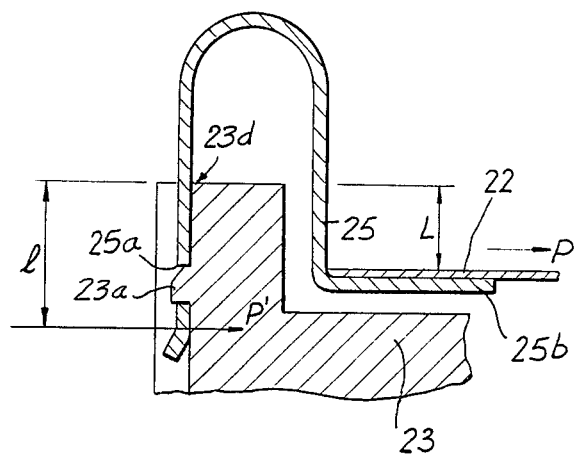
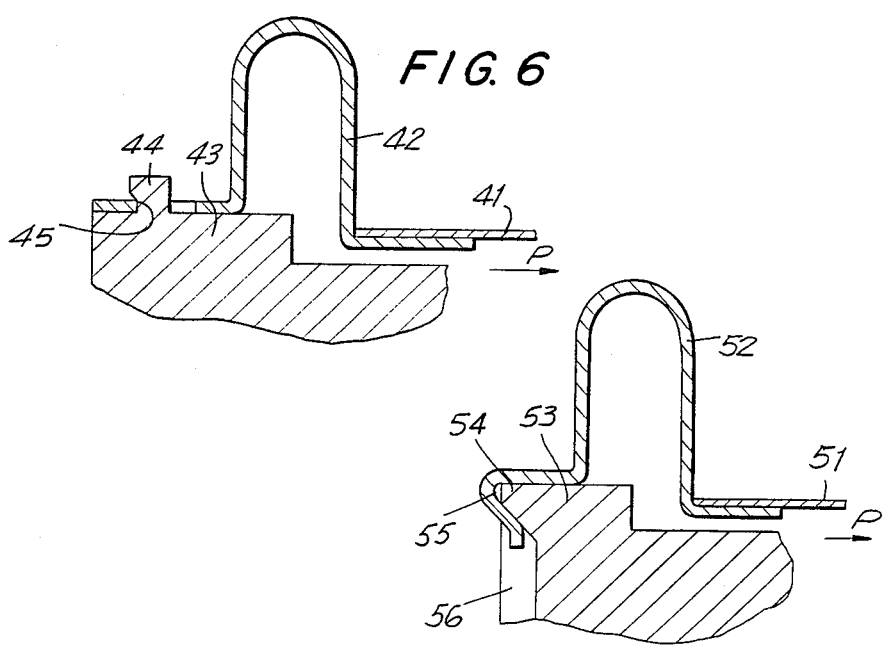

CARRIAGE MOVEMENT DEVICE FOR A MAGNETIC MEMORY DEVICE

This is a continuation of application Ser. No. 617,405 filed June 5, 1984, now abandoned.

BACKGROUND OF THE INVENTION

This invention relates to magnetic memory devices and in particular to a carriage movement device used in a magnetic memory device where the carriage is moved by a belt secured, without screws, to the carriage.

The field of information storage devices, and in particular, magnetic memory storage devices has developed rapidly. The need for a reliable and high speed head access mechanism has increased as the capacity of the devices has increased. The increased capacity of the memory storage device, and in particular disks of particularly high track density and high speed access have made reliable head access mechanisms essential to the proper functioning of the memory devices.

Reference is made to FIGS. 1 and 2 wherein conventional head access mechanisms are depicted. A carriage 3 which carries a head (not shown) is slidably mounted on a rod 4 by a pair of bearings 11. A capstan 1 is directly connected to a stepping motor (not shown) and is rotated in angular steps in the directions indicated by arrow A. A flexible band 2 has a slot 2a at one end. The other end of band 2 is narrower than the width of slot 2a. Band 2 is wound around capstan 1 with the other end of band 2 passing through slot 2a. Band 2 is attached to capstan 1 by a small screw 8. The other end of band 2 is attached to one end of carriage 3 using a washer 9 and a small screw 10. The one end of band 2 has a tension spring 5 and is attached to carriage 3 using a washer 6 and a small screw 7. Tension spring 5 is used to wrap band 2 around capstan 1 by providing sufficient tension to hold band 2 flatly against capstan 1. The prior art also connected band 2 without a tension spring by pulling one end of band 2 to the required tension and then attaching the end of band 2 to carriage 3.

Carriage 3 is moved in directions A' when capstan 1 is rotated in directions A by the stepping motor (not shown). As capstan 1 is angularly rotated in a stepped manner carriage 3 is linearly stepped.

However, there are several problems with the carriage movement device constructed in accordance with the prior art:

(1) When small screw 8 is tightened to fasten band 2 to capstan 1, friction in the direction of rotation of screw 8 causes a torsional force to be exerted on band 2. As a result, the uniform adhesion of band 2 to capstan 1 required for positional accuracy of carriage 3 in response to angular movement of capstan 1 is not present.

(2) When small screws 7 and 10 are tightened to securely attach band 2 to carriage 3 friction produced in the direction of rotation of screws 7, 10 through washers 6, 9 causes torsion of band 2. As a result, there is a loss of linearity of stress in band 2 in the area around small screws 7, 10. When carriage 3 moves to the right (FIG. 1) capstan 1 is closer to the portion of band 2 attached by small screw 7 and the band does not stretch linearly, while the opposite end of band 2 stretches somewhat. When carriage 3 moves to the left the same phenomenon occurs in reverse. As a result, it is not possible with this configuration to maintain the linear correlation between the linear positioning of carriage 3 and the angular stepping movement of capstan 1 required in advanced memory devices.

(3) When small screws 7, 10 are tightened in the process of attaching band 2 to carriage 3 a certain tension must be maintained in band 2. This makes assembly of the device difficult and time consuming. It is even more difficult to assemble the device when tension spring 5 is not used. One end of the band must be attached and the band stretched while the second screw is attached and tightened.

Accordingly, there is a need for a carriage movement device in a magnetic memory device which does not cause torsion of the band at the point at which it is attached to the capstan or the carriage and which is easy to assemble.

SUMMARY OF THE INVENTION

Generally speaking, in accordance with the invention an improved carriage movement device for a magnetic memory device is provided. The carriage has a first end and a second end with the carriage being slidably supported on a rod. A capstan is driven in an angular manner. A belt has a first end and a second end. The belt has a first width from the first end to a first point proximate the center of the belt and a second width, larger than the first width, from the second end to a second point proximate the center of the belt. The belt has a longitudinally oriented hole extending for a portion of the belt having the second width. The hole is at least as wide as the first width. The first end is wrapped around the capstan and through the hole in the belt. A first belt connector is used to connect the first end of the belt to the first end of the carriage. The first end of the belt is affixed to the first belt connector with the first belt connector engaging the first end of the carriage. A second belt connector connects the second end of the belt to the second end of the carriage. The second end of the belt is affixed to the second belt connector with the second belt connector engaging the second end of the carriage. The belt is secured to the capstan and the angular rotation of the capstan is converted into a linear movement of the carriage.

Accordingly, it is an object of the invention to provide an improved carriage movement device for a magnetic memory device.

Another object of the invention is to provide an improved carriage movement device for a magnetic memory device which is easily assembled.

A further object of the invention is to provide a carriage movement device for a magnetic memory device in which the band wrapped around the capstan is connected to the capstan and the carriage without frictionally created torsion.

Still another object of the invention is to provide a carriage movement device for a magnetic memory device in which the band is attached to the carriage without screws.

Still other objects and advantages of the invention will in part be obvious and will in part be apparent from the specification.

The invention accordingly comprises the features of constructions, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is an enlarged cross-sectional view of a portion of the carriage movement device of FIG. 3;

FIG. 6 is an enlarged cross-sectional view of an alternate embodiment of the portion of the carriage movement device of FIG. 3 shown in FIG. 5;

FIG. 7 is an enlarged cross-sectional view of another embodiment of the portion of the carriage movement device of FIG. 3 shown in FIG. 5;

DETAILED DESCRIPTION OF THE PREFERRED EMBODIMENTS

Figure 1:
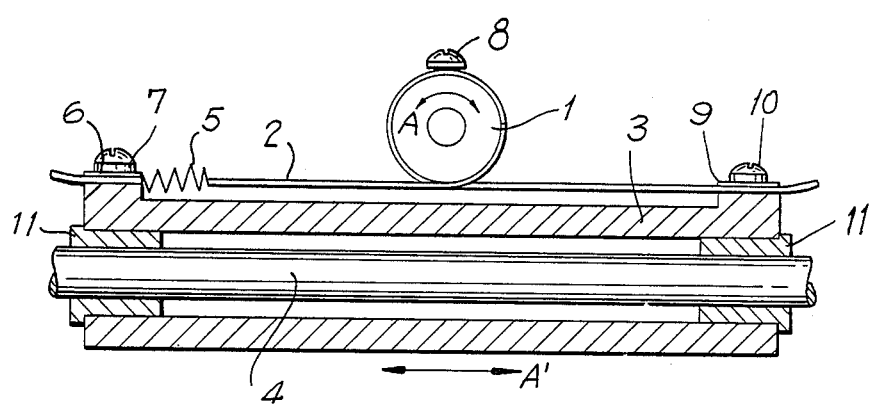
FIG. 1 is a cross-sectional view of a carriage movement device in accordance with the prior art.
Figure 2:
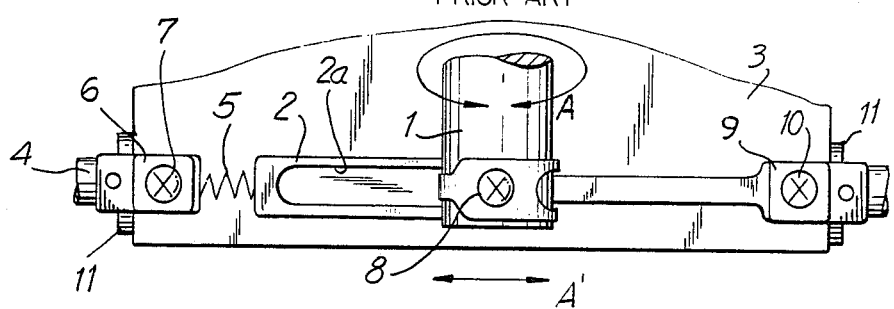
FIG. 2 is a top plan view of the carriage movement device of FIG. 1.
Figure 3:
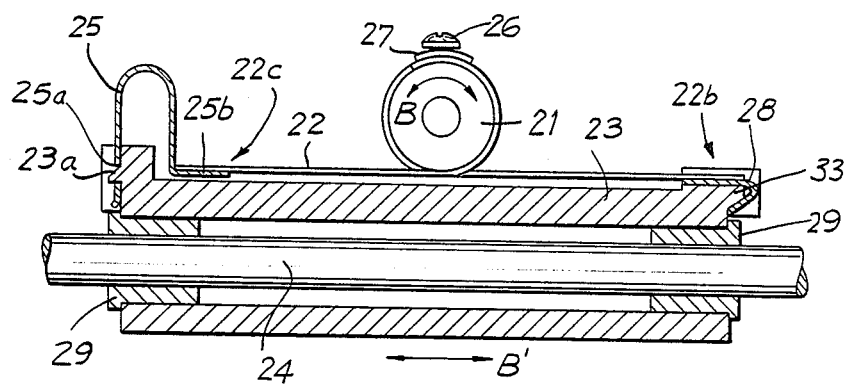
FIG. 3 is a cross-sectional view of a carriage movement device constructed in accordance with the present invention.
Figure 4:
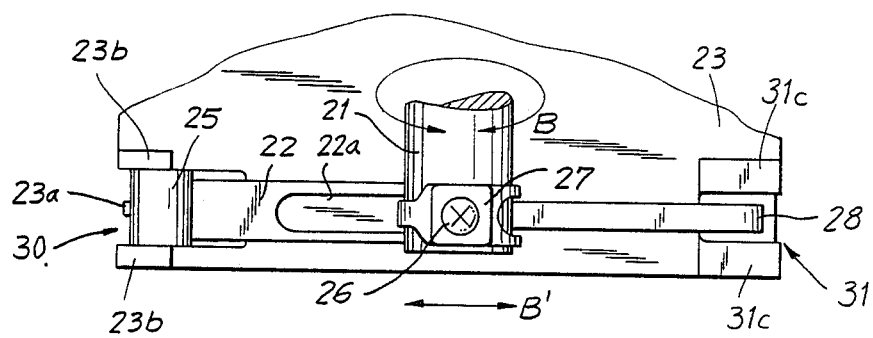
FIG. 4 is a top plan view of the carriage movement device of FIG. 3.

Reference is made to FIGS. 3 and 4 wherein a carriage movement device for a magnetic memory device in accordance with the invention is depicted. The carriage movement device in accordance with the invention, like the prior art carriage movement device, has a capstan 21, a band 22 having a slot 22a and a carriage 23. Belt 22 encircles capstan 21 in the same way in which belt 2 encircle capstan 1 of the prior art carriage movement device. However, no screws are used to attach belt 22 to carriage 23. Instead, a hook 28 is attached to a first end 22b of belt 22. Hook 28 is attached to belt 22 by welding or other attachment process and reinforces the end portion of band 22. Hook 28 fits into a guide slot 31 consisting of guide walls 31c of carriage 23 and projection 33 of carriage 23. Projection 33 is configured to securely receive hook 28 and keep it in place without the need for a screw.

As in the prior art device band 22 is formed with an elongated slot 22a extending from the mid-region towards a second end 22c of band 22. The first end portion of band 22 passes around capstan 21 and through slot 22a. Band 22 is securely attached to capstan 21 so as to maintain the required adhesion for accurate conversion of the angular stepping motion of capstan 21 to linear motion of carriage 23 and a head (not shown) which it carries.

Unlike the prior art device which merely uses a small screw, the device constructed in accordance with the invention includes a washer 27 having a curved shape matching the arc of the outside of band 22 when it is wound around capstan 21. Washer 27 is held in place by a small screw 26, thereby preventing friction to be transmitted to the belt as a torsional force as in the prior art. The elimination of the torsional force applied to band 22 allows for uniform adherance of band 22 to capstan 21 and results in more accurate positioning of carriage 23 during operation.

Band 22 is flexible in the direction in which it is wound around capstan 21. However, it has very limited linear expansion. The band is made of, for example, belt-shaped metal about 0.05 mm thick.

An elastic spring 25 is attached to second end 22c of belt 22. Tension spring 25 is welded to band 22. In the embodiment illustrated in FIG. 3 tension spring 25 is a generally U-shaped member 25 having a leg 25b perpendicular to the U-shaped section extending toward capstan 21 and a guide bore 25a in the leg of the U-shaped section further from capstan 21. Carriage 23 is formed with a pair of guide walls 23b and a projection 23a which engages guide bore 25a. In this way tension spring 25 is connected to carriage 23 and maintains the uniform tension required in belt 22 for accurate transformation of the angular stepping movement of capstan 21 to the linear motion of carriage 23.

Carriage 23 is slidably mounted on a rod 24 by a pair of bearings 29. Carriage 24 slides in the directions indicated by arrow B' in response to a rotation of capstan 21 by the stepping motor (not shown), in the directions indicated by arrow B.

Reference is next made to FIG. 5 wherein tension clip 25 is shown, in greater detail with the carriage movement device fully assembled. Tension P is a reaction force occurring in band 22. Tension spring 25 engages carriage 23 by tension P of band 22 with spring 25 contacting carriage 23 at support 23d. Because there is a distance L between the support 23d and the point of application of tension P, a moment P×L occurs. As a result, there is a possibility that spring 25 may come off carriage 23. In order to prevent this, a second moment arm of length 1, where 1 is larger than L, is added, thereby preventing spring 25 from rotating around point 23d. In addition, the engagement of guide bore 25a with projection 23a adds further stability to the engagement of spring 25 to carriage 23.

When capstan 21 is rotated in angular steps in the directions of arrow B, one end of band 22 is wound onto capstan 21 while the other end of band 22 is wound off capstan 22. These angular movements are transformed into linear movements of carriage 23 so that carriage 23 moves in linear steps in the directions of arrow B'.

As a result of the above described structure the invention has the following advantages over the prior art.

(1) Band 22 is not twisted when small screw 26 is screwed down to attach band 22 to capstan 21. Because small screw 26 is tightened with washer 27, which has the same arc shape as the periphery of band 22, the rotational frictional force of small screw 26 is not transferred to band 22. As a result, band 22 is not twisted and band 22 can more closely and uniformly encircle the periphery of capstan 21. This results in a greater accuracy in transforming the angular stepping movements of capstan 21 to linear stepping movements of carriage 23.

(2) Both ends of band 22 are fixed to carriage 23 so as to prevent distortion of band 22 at the end regions. Band 22 is attached to carriage 23 without the use of the small screws utilized by the prior art which caused torsional stresses in the band, which tend to distort the band and cause an undesirable nonlinearity of carriage movement. The carriage movement device according to the invention does not distort the shape of band 22, particularly in the end regions, and as a result the accurate correlation between the positioning of carriage 23 and the rotational positioning of capstan 21 is linear as desired.

(3) The belt is easily attached to the carriage. Unlike the prior art device which requires the belt to be screwed in place at both ends of the carriage, and if a tension spring is not present to stretch the band, the present invention is easily assembled. Hook 28 is inserted on projection 33 and tension clip 25 is slid over the other end of carriage 23 between guide walls 23b until projection 23a engages guide bore 25a. There is no need for adjustment or tightening of screws or stretching band 22 to a particular tension and maintaining this tension while a screw is tightened. In a like manner the belt can be easily removed from carriage 23.

Reference is next made to FIGS. 6, 7, 8, 9, 10 wherein alternate embodiments of tension clip 25 are depicted. In FIG. 6 a tension clip 42 is attached to a band 41 by, for example, welding. Tension clip 42 is attached to a carriage 43 by engaging a projection 44 of carriage 43 with a guide bore 45 in tension clip 42. Tension clip 42 supplies the necessary tension P to keep band 41 tightly wound around capstan 21. In the embodiment of FIG. 6, as well as those of FIGS. 7-10, the remaining structure of the carriage movement device is identical to that depicted in FIGS. 3, 4.

Reference is next made to FIG. 7 wherein a tension spring 52 is attached to a band 51 by, for example, welding. Tension clip 52 is secured to a carriage 53 by the engagement of a projection 54 of carriage 53 and a hook 55 at one end of tension spring 52. Tension spring 52 is attached to carriage 53 by pulling tension spring 52 to the left (FIG. 7) and sliding hook 55 around projection 54. Hook 55 is kept from moving laterally by guidewalls 56 of carriage 53.

Figure 8:
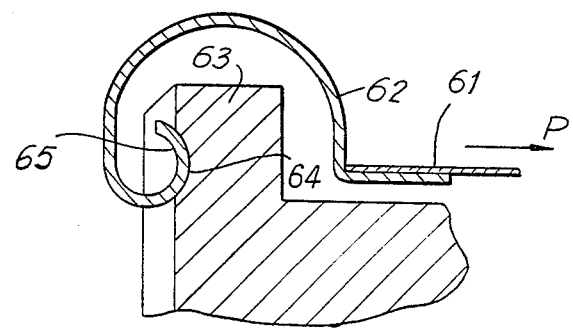
FIG. 8 is an enlarged cross-sectional view of another embodiment of the portion of the carriage movement device of FIG. 3 shown in FIG. 5.

Reference is next made to FIG. 8 wherein a tension spring 62 is attached to a band 61 by, for example, welding. Tension spring 62 is a coiled member having a spiral region 65 which is received within a curved depression 64 formed in a carriage 63. Belt 61 is coupled to carriage 63 by stretching tension spring 62 and allowing spiral region 65 to release into depression 64.

The alternate embodiments illustrated in FIGS. 6, 7, 8 function and are assembled in the same manner as the embodiment of FIGS. 3 4, 5 with tension springs 42, 52, 62 supporting a tension P required to evenly wind bands 41, 51 or 61 around capstan 21. When an angular stepping motion is applied to capstan 21 carriages 43, 53 or 63 move in a corresponding linear stepping movement which allows for accurate placement of the magnetic head (not shown), which is supported on carriages 43, 53 or 63. In addition, tension springs 42, 52, 62 are very easily connected to carriages 43, 53, 63, respectively, by adding a force to the springs and then inserting the springs into the appropriate connectors on the carriages. Therefore, in addition to the improved accuracy of the carriage positioning, the device is easy to assemble.

Figure 9:
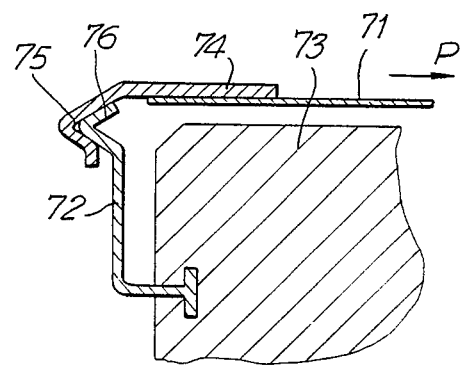
FIG. 9 is an enlarged cross-sectional view of an alternate embodiment of the portion of the carriage movement device of FIG. 3 shown in FIG. 5.

Reference is next made to FIG. 9 wherein another embodiment of the invention is depicted. Unlike the embodiments of FIGS. 5, 6, 7, 8 the member attached to the belt is not elastic. In this embodiment one end of a connector 74 is coupled to a belt 71 by, for example, welding. The other end of member 74 has an angled projection 75. An elastic member 72 is connected to carriage 73. Elastic member 72 has an angled member 76 configured to receive on its outside surface the inside surface of angled member 75. Unlike the previously described embodiments the tension is provided by elastic member 72 rather than member 74, which is directly connected to belt 71. However, the assembly of the carriage movement device, and in particular the connection of belt 71 to carriage 73 is as easily accomplished. Elastic member 72 is pressed towards the right (FIG. 9) and angled member 75 is slipped around angled member 76. Then elastic member 72 is released and belt 71 is firmly in place. In this way the required tension P is applied to band 71, thereby tightly wrapping it around capstan 21, for positional accuracy of carriage 73.

Figure 10:
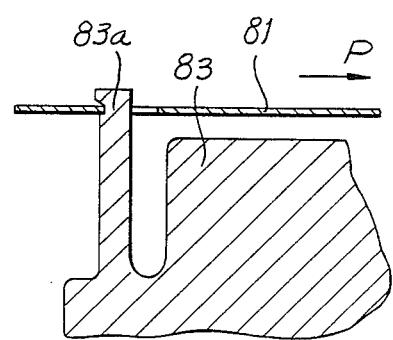
FIG. 10 is enlarged cross-sectional view of an alternate embodiment of the portion of the carriage movement device of FIG. 3 shown in FIG. 5.

Reference is next made to FIG. 10 wherein another embodiment of the invention is depicted. A carriage 83 if formed with an elastic projection 83a, which connects directly to band 81, supporting the tension P required for winding band 81 closely around capstan 21. Elastic projection 83a, which is a part of carriage 83, takes the place of the tension springs used in other embodiments of the invention. Because there is no tension spring, or other member attached to band 81, the assembly is further simplified. In this embodiment band 81 has a tension P exerted on it to the left (FIG. 10) before it is coupled to elastic projection 83a.

Accordingly, a head access mechanism for a magnetic memory device of improved construction is provided. This invention improves the accuracy of the stepping movement of the carriage by maintaining an accurate linear relationship between the angular movement of the stepping motor and the motion of the carriage bearing a magnetic head. In addition, the device is simplified and made more reliable in addition to being easily assembled.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A carriage movement device for a magnetic memory device having carriage means with a first end with a projecting end and a second end, said carriage means slidably mounted for linear displacement on a rod in response to rotational movement of a capstan, comprising:

belt means, having a first end and a second end, said belt means having a first width from the first end to a first point proximate the center of the belt means, and a second width, larger than the first width, from the second end to a second point proximate the center of the belt means, said belt means having a longitudinally oriented hole extending for a portion of the belt means having the second width, said hole being at least as wide as the first width, said first end wrapped around the capstan and through the hold in the belt means;

capstan securing means for securing the belt means to the capstan and adapted to avoid imparting any torsional forces to said belt means;

first belt connector means including a hook fixed to one end of the belt means for releasably engaging the projecting end of the carriage means by tension of said belt means;

second belt connector means fixed to the other end of the belt means for releasably engaging the second end of the carriage means by tension of said belt means;

biasing means provided in said second belt connector means for engaging said second belt connector means and belt means to said carriage means, said biasing means biased along the belt means away from the end of the carriage means;

said biasing means for engaging said second connector means comprising a generally U-shaped section with a first substantially straight leg and a second substantially straight leg, said first and second legs having free ends and connected ends, said first and second legs being connected at their connected ends by a rounded section, the biasing means further including a third straight leg generally perpendicular to the first and second straight legs, said third straight leg connected to said second straight leg at the free end of the second leg, said third leg secured to the other end of said belt means and the first leg engaging said carriage;

said other end of said carriage means being located between said first leg and said second leg and including a support portion adjacent to the first leg, the support portion including an engaging projection, said first leg including a recess adapted to engage with said projection to prevent the displacement of said biasing means along the first and second leg; and said third leg located at a position a specified distance apart from said support portion toward the free end of the first and second legs;

whereby the angular rotation of the capstan is converted into a linear movement of the carriage means.

2. The carriage movement device of claim 1, wherein the first belt connector means is fixed to the first end of the belt means and the second belt connector means is fixed to the second end of the belt means.

3. The carriage movement device of claim 2 wherein the first belt connector means comprises a member having a flat end and the hook, said flat end being affixed to the belt means and the hook engaging said projecting end.

4. The carriage movement device of claim 3, wherein the carriage means further includes guide walls extending parallel to the projection, one guide wall on each side of the projection.

5. The carriage movement device of claim 1 wherein the capstan securing means comprises a curved washer having the same arc as the outside periphery of the belt means wrapped around the capstan placed on the belt means and a screw for securing the washer to the capstan.

6. The carriage movement device of claim 1, wherein the second belt connector means includes the biasing means for engaging said carriage means.

7. The carriage movement device of claim 6, wherein the second belt connector means has a first end and a second end, said first end affixed to said belt means, said second end engaging said second end of said carriage means.

8. The carriage movement device of claim 7 wherein the first end of the second belt connector means is welded to the belt means.

9. The carriage movement device of claim 1, wherein the first leg is longer than the second leg.

10. The carriage movement device of claim 1, wherein the belt means is welded to the third leg of the second belt connector means.

11. The carriage movement device of claim 1, wherein the the rotational movement of the capstan is caused by a stepping motor.

12. The carriage movement device of claim 1, wherein the belt means is a belt shaped piece of metal.

13. The carriage movement device of claim 12, wherein the belt shaped piece is about 0.05 mm thick.

* * * * *